US009965329B2

(12) United States Patent
Blagodurov

(10) Patent No.: US 9,965,329 B2
(45) Date of Patent: May 8, 2018

(54) METHOD AND APPARATUS FOR WORKLOAD PLACEMENT ON HETEROGENEOUS SYSTEMS

(71) Applicant: Advanced Micro Devices, Inc., Sunnyvale, CA (US)

(72) Inventor: Sergey Blagodurov, Bellevue, WA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 132 days.

(21) Appl. No.: 14/880,713

(22) Filed: Oct. 12, 2015

(65) Prior Publication Data
US 2017/0102971 A1    Apr. 13, 2017

(51) Int. Cl.
*G06F 9/46* (2006.01)
*G06F 9/50* (2006.01)

(52) U.S. Cl.
CPC .......... *G06F 9/5044* (2013.01); *G06F 9/5038* (2013.01)

(58) Field of Classification Search
CPC .................................................. G06F 9/5044
USPC ........................................................ 718/104
See application file for complete search history.

(56) References Cited

U.S. PATENT DOCUMENTS

| 8,260,840 B1* | 9/2012 | Sirota | G06F 9/5061 370/216 |
| 2003/0099254 A1* | 5/2003 | Richter | G06Q 10/10 370/466 |
| 2005/0234937 A1* | 10/2005 | Ernest | G06F 11/3495 |
| 2006/0294347 A1* | 12/2006 | Zou | G06F 9/3009 712/244 |
| 2007/0006218 A1* | 1/2007 | Vinberg | G06F 8/61 717/174 |
| 2007/0098022 A1* | 5/2007 | Furuta | G06F 9/4405 370/503 |
| 2009/0031312 A1* | 1/2009 | Mausolf | G06F 9/5072 718/102 |

(Continued)

OTHER PUBLICATIONS

Stam, Nick; "Mile High Milestone: Tegra K1 "Denver" Will Be First 64-bit ARM Processor for Android"; https://blogs.nvidia.com; Aug. 11, 2014.

(Continued)

*Primary Examiner* — Timothy A Mudrick
(74) *Attorney, Agent, or Firm* — Faegre Baker Daniels LLP

(57) ABSTRACT

The methods and apparatus can assign processing core workloads to processing cores from a heterogeneous instruction set architectures (ISA) pool of available processing cores based on processing core metric results. For example, the method and apparatus can obtain processing core metric results for one or more processing cores, such as processing cores within general purpose processors, from a heterogeneous ISA pool of available processing cores. The method and apparatus can also obtain one or more processing core workloads, such as software applications or software processes, from a pool of available processing core workloads to be assigned. The method and apparatus can then assign one or more processing core workloads that have higher priority than others from the pool of available processing core workloads to a processing core from the heterogeneous ISA pool of available processing cores based on its processing core metric result.

20 Claims, 7 Drawing Sheets

(56) References Cited

U.S. PATENT DOCUMENTS

| | | | |
|---|---|---|---|
| 2012/0054770 A1* | 3/2012 | Krishnamurthy | G06F 9/4893 718/105 |
| 2013/0111035 A1* | 5/2013 | Alapati | G06F 9/5072 709/226 |
| 2014/0172783 A1* | 6/2014 | Suzuki | G06F 8/63 707/609 |

OTHER PUBLICATIONS

Hectronic; "Considerations for the embedded segment"; www.hectronic.se; printed Dec. 14, 2017.
Wikipedia; Page Size Extension; Oct. 23, 2016.
Wikipedia; ARM big.LITTLE; Nov. 9, 2017.

* cited by examiner

METHOD AND APPARATUS FOR WORKLOAD PLACEMENT ON HETEROGENEOUS SYSTEMS

BACKGROUND OF THE DISCLOSURE

The disclosure relates generally to methods and apparatus to assign processing core workloads to processing systems.

Datacenters, and in particular cloud datacenters, are becoming increasingly utilized to execute processing core workloads. Cloud datacenters may include a multitude of servers that operate over a network (e.g., the internet) and make available their computing and memory resources to service subscribers. By subscribing to use the services of a cloud datacenter, a subscriber is able to submit processing core workloads, such as software applications, to one or more of the cloud datacenter's servers for processing execution. For example, software applications may execute on a cloud datacenter's server such that software application users are able to access the software applications over the network. The servers may include one or more general purpose processors, whereby the general purpose processors include one or more processing cores. These processing cores, as known in the art, are based on instruction set architectures (ISAs). More popular processing core ISAs include ARM® and x86 ISAs. Servers may include processing cores that are all based on the same ISA. For example, a server may include general purpose processors that include only processing cores based on the ARM® ISA. Servers may also include processing cores based on different ISAs. For example, a heterogeneous ISA based server may include one or more general purpose processors that include processing cores based on different ISAs, such as ARM® and x86 ISAs. As such, datacenters, for example cloud datacenters, may include servers that include processing cores based on the same, or different, ISA(s).

As mentioned, these servers and their associated processing cores may be available for processing core workload processing. Processing cores based on a particular ISA may be more suitable for different types of processing core workloads than processing cores based on another ISA due to, for example, varying features of the ISA based processing core. For example, processing cores based on different ISAs may have varying memory architectures such as varying memory page sizes. As a result, a processing core based on one ISA may have differing performance characteristics than a processing core based on a different ISA. As such, these varying characteristics of ISA based processing cores may lead to differing results when measured according to a processing core metric (e.g., results based on a particular processing core metric). Processing core metrics may include, for example, startup (e.g., bootup) times, processing core execution rates, and processing core power efficiencies. For example, a processing core based on one ISA may be more power efficient than a processing core based on a different ISA. Similarly, a processing core based on one ISA may execute at a faster rate than a processing core based on a different ISA.

In addition, processing core workloads such as, for example, software applications may have associated requirements or preferences (e.g., processing core workload importance information) for execution. For example, execution requirements or preferences may include processing core or server bootup (e.g., startup) times (e.g., maximum amount of time before processing core workload execution), execution times (e.g., maximum amount of time for executing the processing core workload), memory requirements, and others as known in the art. These requirements or preferences may be used to determine whether a processing workload is critical. For example, critical processing workloads may include processing workloads that should be executed as quickly as possible and/or before other (e.g., non-critical) processing workloads based upon execution requirements or preferences. As such, it may be more desirable to have a processing core based on a particular ISA process a particular processing core workload than to have it processed by a processing core based on another ISA. Thus, there are opportunities for elaborate placement (e.g., assignment) of processing core workloads to ISA-based processing cores most suited to execute a particular processing core workload.

BRIEF DESCRIPTION OF THE DRAWINGS

The embodiments will be more readily understood in view of the following description when accompanied by the below figures and wherein like reference numerals represent like elements, wherein.

DETAILED DESCRIPTION OF THE PREFERRED EMBODIMENTS

Figure 1:
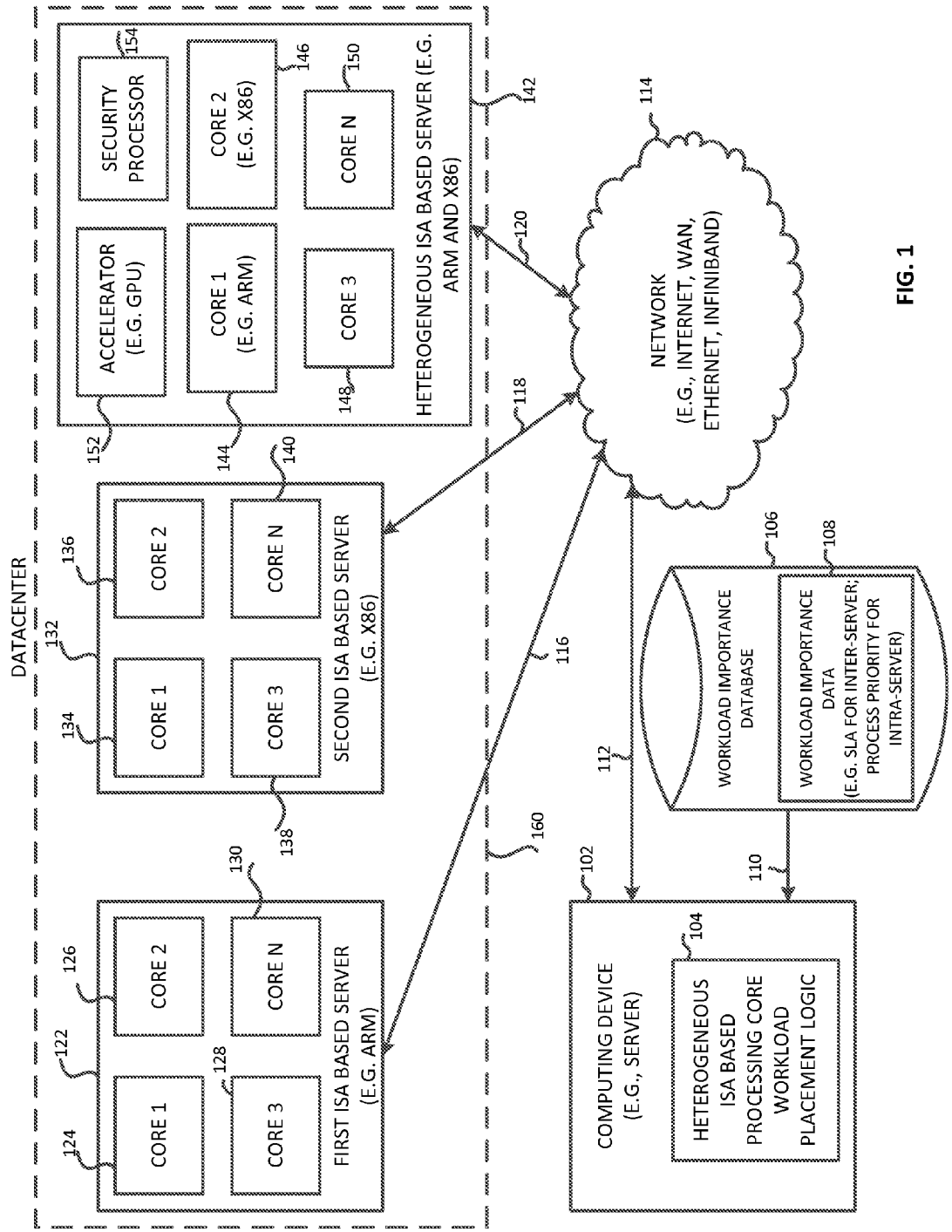
FIG. 1 is a functional block diagram illustrating an example of a computing device, such as a server, that includes heterogeneous ISA based processing core workload placement logic that may place processing core workloads to one or more servers over a network in accordance with one example set forth in the disclosure.

Briefly, methods and apparatus assign processing core workloads to processing cores from a heterogeneous ISA pool of available ISA based processing cores based on processing core metric results. For example, the method and apparatus may assign processing core workloads to ISA based processing cores within a heterogeneous ISA based server (e.g., a server that includes processing cores operating different ISAs) that is part of a cloud based datacenter. The processing core workloads may be assigned to the ISA based processing cores based on varying processing core metric results among processing cores based on different ISAs. Varying processing core metric results may include, for example, ISA type, processing core boot up times, or processing core execution rates among the processing cores based on different ISAs.

In one embodiment, the method and apparatus obtain processing core metric results for one or more processing cores, such as processing cores within general purpose processors, from a heterogeneous ISA pool of available processing cores. The method and apparatus may also obtain one or more critical processing core workloads, such as software applications or software processes, from a pool of available processing core workloads to be assigned. For example, critical processing workloads may include processing core workloads that have associated execution requirements or preferences such that those processing workloads should execute before others or as quickly as possible. Critical processing workloads may also include, for example, higher priority processing workloads, while non-critical processing workloads may include lower priority processing workloads. The method and apparatus may assign one or more critical (e.g., higher priority) processing core workloads from the pool of available processing core workloads to a processing core from the heterogeneous ISA pool of available processing cores with a most favorable processing core metric result. For example, a most favorable processing core metric result may include one that indicates a better or higher processing core performance. For example, a cloud datacenter may include multiple servers each with one or more general purpose processors available to execute processing core workloads. The general processors may include one or more processing cores where each processing core is based on a particular ISA. As an example, some processing cores may be based on the ARM® ISA, while others may be based on the x86 ISA. Together, the processing cores form a heterogeneous ISA pool of available processing cores. Processing core metrics, such as processing core speed (e.g., execution rate), may be obtained from multiple processing cores of the heterogeneous ISA pool of available processing cores. Processing core workloads that are determined to be critical are then assigned to the fastest executing processing cores. As such, those processing core workloads determined to be critical will execute on the fastest ISA based processing cores from the heterogeneous ISA pool of available processing cores.

In one embodiment, the method and apparatus obtain processing core bootup times for one or more processing cores from the heterogeneous ISA pool of available processing cores, and assign one or more critical processing core workloads from the pool of available processing core workloads to the processing core with the shortest (e.g., fastest) bootup time. In one embodiment, the method and apparatus determine a non-critical processing core workload from the pool of available processing core workloads to be assigned, and assign the non-critical processing core workload to a processing core from the heterogeneous ISA pool of available processing cores with a longer (e.g., slower) bootup time relative to the bootup time for the processing core with the shortest bootup time.

In one embodiment, the method and apparatus obtain service level agreement data to determine one or more critical processing core workloads from the pool of available processing core workloads to be assigned based on the obtained service level agreement data. For example, a customer (e.g., user) of a cloud datacenter may negotiate a service level agreement allowing the customer to utilize the services of a cloud datacenter. The service level agreement may allow the customer to execute processing workloads on the fastest available processing cores within the cloud datacenter. As such, service level agreement data may indicate that the processing core workloads associated with the user are critical, such that they should execute on the fastest available processing cores within the cloud datacenter.

In one embodiment, the method and apparatus obtain one or more higher priority processing core workloads from the pool of available processing core workloads. The method and apparatus may also obtain memory page sizes for the plurality of processing cores. The method and apparatus may assign one or more higher priority processing core workloads from the pool of available processing core workloads to a processing core from the heterogeneous ISA pool of available processing cores with a larger memory page size compared to, for example, memory page sizes for other processing cores from the heterogeneous ISA pool of available processing cores. For example, a processing core workload with a highest priority may be assigned to a processing core with the largest memory page size. As such, higher prioritized processing core workloads may benefit from faster memory access times, e.g., due to reduced memory Translation Lookaside Buffer (TLB) misses.

In another example, the method and apparatus obtain one or more lower priority processing core workloads from the pool of available processing core workloads. The method and apparatus may assign one or more lower priority processing core workloads from the pool of available processing core workloads to a processing core from the heterogeneous ISA pool of available processing cores with a smaller memory page size. For example, a processing core workload with a priority lower than a priority for another processing core workload may be assigned to a processing core with a smaller memory page size relative to the memory size of the processing core with the largest memory page size.

In one embodiment, the method and apparatus obtain performance characteristics for the plurality of processing cores from the heterogeneous ISA pool of available processing cores. For example, the method and apparatus may obtain performance characteristics indicating the execution rate of the processing cores. The method and apparatus may then assign one or more critical processing core workloads from the pool of available processing core workloads to the fastest executing processing core from the heterogeneous ISA pool of available processing cores based on the obtained performance characteristics. In another example, the method and apparatus obtain one or more non-critical processing core workloads from the pool of available processing core workloads. The method and apparatus may then assign one or more non-critical processing core workloads from the pool of available processing core workloads to a slower processing core from the heterogeneous ISA pool of available processing cores based on the slower processing core's performance characteristic relative to the fastest executing processing core's performance characteristic.

In another example, the method and apparatus obtain processing core metric results from one or more processing cores based on a first ISA from the heterogeneous ISA pool of available processing cores that may be associated with a server (e.g., a first ISA based server). The method and apparatus may obtain processing core metric results from one or more processing cores based on a second ISA from the heterogeneous ISA pool of available processing cores that may be associated with another server (e.g., a second ISA based server). The method and apparatus may obtain processing core metric results from one or more heterogeneous ISA based processing cores (e.g., processing cores based on different ISAs) from the heterogeneous ISA pool of available processing cores that may be associated with yet another server (e.g., heterogeneous ISA based server). The method and apparatus may also obtain one or more critical applications awaiting to be scheduled for execution. The method and apparatus may then assign one or more of the critical applications to at least one of the first ISA based processing cores, second ISA based processing cores, and heterogeneous ISA based processing cores. For example, the method and apparatus may assign one or more critical applications to a processing core based on an ISA with a most favorable processing core metric result, such as, for example, a fastest execution rate. In another example, the method and apparatus may compare a processing core metric of processing cores based on different ISAs, and may assign one or more critical applications to the ISA based processing core with a more favorable processing core metric.

Among other advantages, the methods and apparatus provide for the assignment of processing core workloads from a pool of available processing core workloads to processing cores from a heterogeneous ISA pool of available processing cores based on obtained processing core metric results. As such, the methods and apparatus allow for the assignment of a processing core workload to a processing core based on a more suitable ISA for the particular processing core workload. In this manner, processing core workload requirements or preferences associated with the assigned processing core workloads are met or satisfied. In addition, datacenter processing workload execution efficiencies are improved. For example, processing core workloads are assigned to ISA based processing cores within cloud datacenter servers, such as cloud datacenters that make available a heterogeneous ISA pool of processing cores for executing processing core workloads, that are better suited (e.g., optimized) to execute a particular processing core workload. Persons of ordinary skill in the art would recognize and appreciate further advantages as well.

Turning now to the drawings, and as described in detail below, one example of the presently disclosed system, as shown in FIG. 1, is a computing device 102, such as a server, that includes heterogeneous ISA based processing core workload placement logic 104. The system may also include workload importance database 106, and one or more servers, such as first ISA based server 122, second ISA based server 132, and heterogeneous ISA based server 142, that may be part of datacenter 160 (e.g., such as a cloud datacenter). In some embodiments, some or all of the functions of computing device 102 may be performed by any suitable processor or processors that may, for example, execute a software driver, firmware, or any other suitable executable code stored in memory. For example, some or all of the functions of heterogeneous ISA based processing core workload placement logic 104 may be performed by any suitable processing core. In some embodiments, heterogeneous ISA based processing core workload placement logic 104 may be an accelerated processing unit (APU), a central processing unit (CPU), a field programmable gate array (FPGA), an application-specific integrated circuit (ASIC), or any other suitable instruction processing device.

First ISA based server 122 may include processing cores based on a particular ISA, such as, for example, the ARM® ISA. For example, as indicated in the figure, first ISA based server 122 may include processing core 1 124, processing core 2 126, processing core 3 128, and processing core N 130, that are based on the same ISA. The processing cores may be processing cores within, for example, general purpose processors, or any other suitable processing cores based on an ISA. Likewise, second ISA based server 132 may include processing cores based on a particular ISA. In one example, the processing cores of second ISA based server 132 use a different ISA from the processing cores of first ISA based server 122. For example, while the processing cores of first ISA based server 122 may be based on the ARM® ISA, the processing cores of the second ISA based server 124 may be based on the x86 ISA. Heterogeneous ISA based server 142 may include processing cores based on differing ISAs. For example, heterogeneous ISA based server 142 may include processing core 1 144 that may be based on a particular ISA (e.g., ARM® ISA), and processing core 2 146 that may be based on a different ISA (e.g., x86 ISA). Heterogeneous ISA based server 142 may also include processing core 3 148 and processing core N 150, each of which may be based on any suitable ISA. Heterogeneous ISA based server 142 may also include special purpose processors or processing cores, such as accelerator 152 and security processor 154, as known in the art. For example, accelerator 152 may be a graphics processing unit (GPU). As recognized by those of ordinary skill in the art, the number of processing cores is variable. For example, first ISA based server 122 may include 16, 32, or any suitable number of processing cores. Similarly, second ISA based server 132 and heterogeneous ISA based server 142 may include any suitable number of processing cores. As such, the processing cores of first ISA based server 122, second ISA based server 132, and heterogeneous ISA based server 142 may be part of a heterogeneous ISA pool of available processing cores. For example, the processing cores of first ISA based server 122, second ISA based server 132, and heterogeneous ISA based server 142 may be available to process (e.g., execute) processing core workloads.

First ISA based server 122, second ISA based server 132, and heterogeneous ISA based server 142 may be operable to communicate with network 114 as is known in the art. For example, first ISA based server 122 may be operable to communicate with network 114 over communication link 116. Likewise, second ISA based server 132 may be operable to communicate with network 114 over communication link 118, and heterogeneous ISA based server 142 may be operable to communicate with network 114 over communication link 120. Network 114 may be any suitable network that allows communication amongst multiple devices (e.g., Ethernet, InfiniBand, WAN, Internet). As such, first ISA based server 122, second ISA based server 132, and heterogeneous ISA based server 142 may be operable to provide processing core identification and metric results to network 114. For example, first ISA based server 122 may be operable to provide to network 114 processing core metric results for processing core 1 124, processing core 2 126, processing core 3 128, and processing core N 130. Second ISA based server 132 and heterogeneous ISA based server 142 may similarly provide processing core metric results for their respective processing cores.

Computing device 102 may be operably coupled to workload importance database 106 which may store workload importance data 108. For example, computing device 102 may be operable to receive (e.g., request and read) workload importance data 108 over communication link 110. Workload importance data 108 may include, for example, service level agreement (SLA) information that may specify processing core workload priorities for a server (e.g., interserver) in datacenter 160. In one example, SLA information may specify that processing core workloads provided by one client (e.g., customer) of datacenter 160 receive a higher priority than processing core workloads provided by another datacenter 160 client (e.g., the first client pays a higher fee than the second client for use of a server within datacenter 160). Alternatively or additionally, workload importance data 108 may include processing core workload priority information that may specify processing core workload priorities among various servers within datacenter 160 (e.g., intra-server).

Computing device 102 may be operable to communicate with network 114 over, for example, communication link 112. As such, computing device 102 may be operable to obtain processing core metric results, such as the processing core metric results associated with the processing cores of first ISA based server 122, second ISA based server 132, and heterogeneous ISA based server 142. Computing device 102 may be operable to determine critical or non-critical processing workloads from, for example, a pool of available processing core workloads needing to be assigned to a processing core for processing. As such, heterogeneous ISA based processing core workload placement logic 104 may be operable to assign a processing core workload from the pool of available processing core workloads to an available processing core. For example, heterogeneous ISA based processing core workload placement logic 104 may assign a critical processing core workload to a processing core associated with either first ISA based server 122, second ISA based server 132, or heterogeneous ISA based server 142. In one example, heterogeneous ISA based processing core workload placement logic 104 assigns a critical processing core workload to a processing core with a most favorable processing core metric result. In another example, heterogeneous ISA based processing core workload placement logic 104 assigns a noncritical processing core workload to a processing core with a longer bootup time relative to a processing core with the shortest bootup time.

Figure 2:
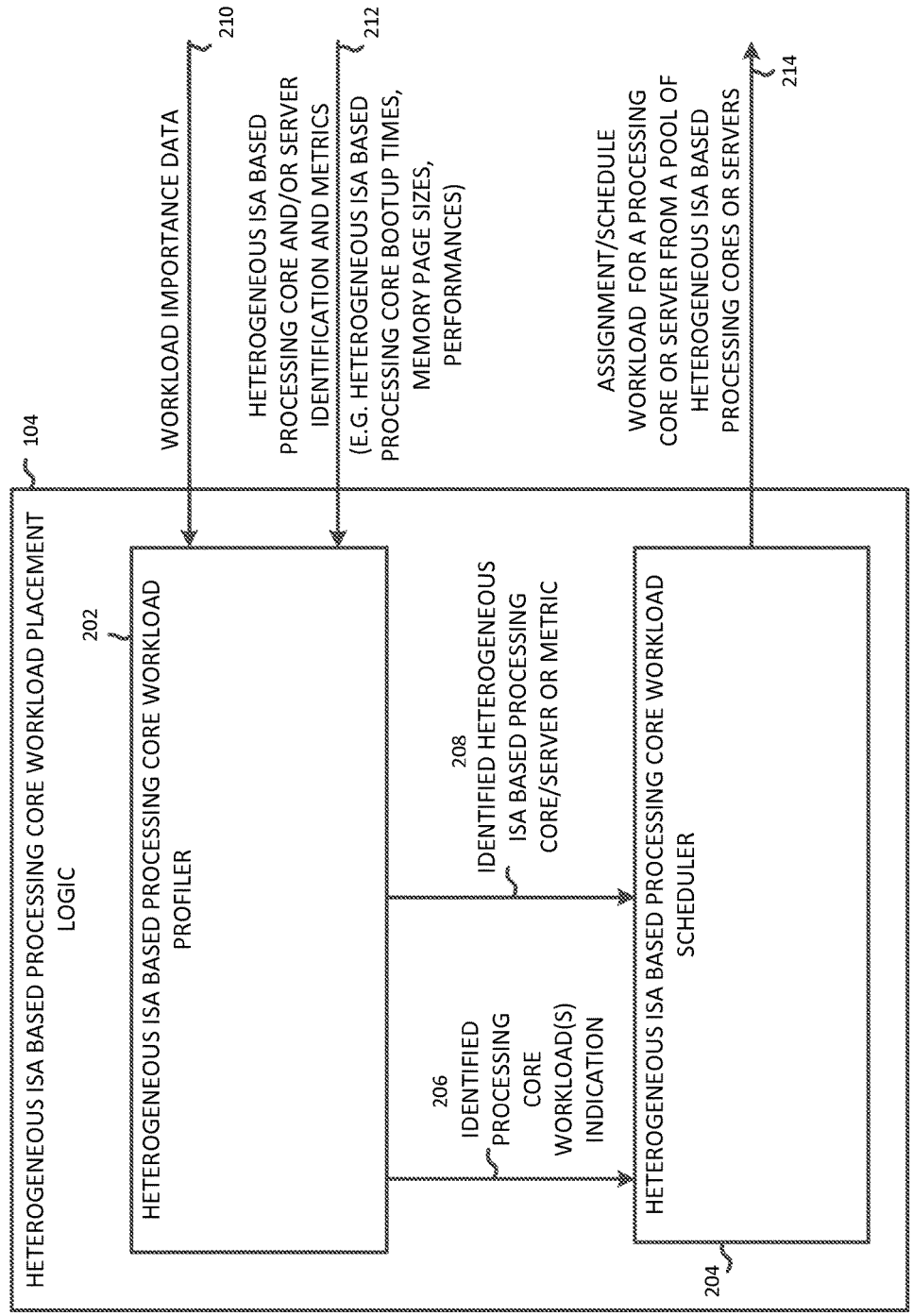
FIG. 2 is a more detailed functional block diagram of the heterogeneous ISA based processing core workload placement logic of FIG. 1 in accordance with one example set forth in the disclosure.

FIG. 2 is a more detailed functional block diagram of the heterogeneous ISA based processing core workload placement logic 104 of FIG. 1. As indicated in the figure, heterogeneous ISA based processing core workload placement logic 104 includes heterogeneous ISA based processing core workload profiler 202 and heterogeneous ISA based processing core workload scheduler 204. Heterogeneous ISA based processing core workload profiler 202 may obtain (e.g., receive) workload importance data 210, which may be received over communication link 110, as described with respect to FIG. 1 above. Heterogeneous ISA based processing core workload profiler 202 may be operable to profile one or more processing core workloads based on, for example, the obtained workload importance data 210. For example, the obtained workload importance data 210 may indicate whether a processing core workload is critical or non-critical, or may indicate a priority for a processing core workload (e.g., based on SLA information). Heterogeneous ISA based processing core workload profiler 202 may then identify a processing core workload, such as the most critical processing core workload, and provide the identified processing core workload indication 206 to the heterogeneous ISA based processing core workload scheduler 204.

Heterogeneous ISA based processing core workload profiler 202 may obtain heterogeneous ISA based processing core and/or server identification and metrics 212, which may be received over communication link 112 as described above with respect to FIG. 1. For example, heterogeneous ISA based processing core and/or server identification and metrics 212 may include information such as processing core bootup times, memory page sizes, processing core performance characteristics, or other processing core and/or server identification and metric information. Heterogeneous ISA based processing core workload profiler 202 may identify (e.g., determine) a processing core metric to be used for assigning processing core workloads, such as the identified processing core workload associated with identified processing core workload indication 206, based on, for example, the obtained heterogeneous ISA based processing core and/or server identification and metrics 212. Similarly, heterogeneous ISA based processing core workload profiler 202 may identify a processing core or server for processing a processing core workload. Heterogeneous ISA based processing core workload profiler 202 may then provide the identified processing core/server or metric 208 to the heterogeneous ISA based processing core workload scheduler 204.

Heterogeneous ISA based processing core workload scheduler 204 may be operable to assign the identified processing core workload associated with the identified processing core workload indication 206 to a processing core, such as a processing core associated with datacenter 160. For example, heterogeneous ISA based processing core workload scheduler 204 may assign one or more critical processing core workloads to a processing core with a most favorable processing core metric result, such as a processing core associated with either first ISA based server 122, second ISA based server 132, or heterogeneous ISA based server 142.

In one embodiment, heterogeneous ISA based processing core workload scheduler 204 may profile a software application by assigning the software application to a processing core or server based on a particular processing core or server metric, such as processing core bootup times. The heterogeneous ISA based processing core workload scheduler 204 may then schedule the software application to another processing core or server based on a different processing core or server metric, such as processing core memory page size. Profiling results, such as software application execution times, for each software application scheduling may be received by heterogeneous ISA based processing core workload profiler 202, which may be included, for example, in heterogeneous ISA based processing core and/or server identification and metrics 212. The profiling results may then be used by heterogeneous ISA based processing core workload profiler 202 to determine which processing core or server metric to provide heterogeneous ISA based processing core workload scheduler 204 via the identified processing core/server or metric 208 when scheduling the same or similar software applications in accordance with received workload importance data 210. For example, workload importance data 210 may indicate that a particular software application is critical such that the software application is to be executed as quickly as possible (e.g., executed as soon as possible and before non-critical software applications). Heterogeneous ISA based processing core and/or server identification and metrics 212 may indicate that the software application executes faster (e.g., in the shortest amount of time) when assigned to a processing core or server based on ISAs that include larger memory page sizes rather than faster processing core speeds. As such, heterogeneous ISA based processing core workload profiler 202 may identify memory page size as the identified processing core/server or metric 208, rather than processing core speeds, when the same or similar software applications are to be scheduled.

Figure 3:
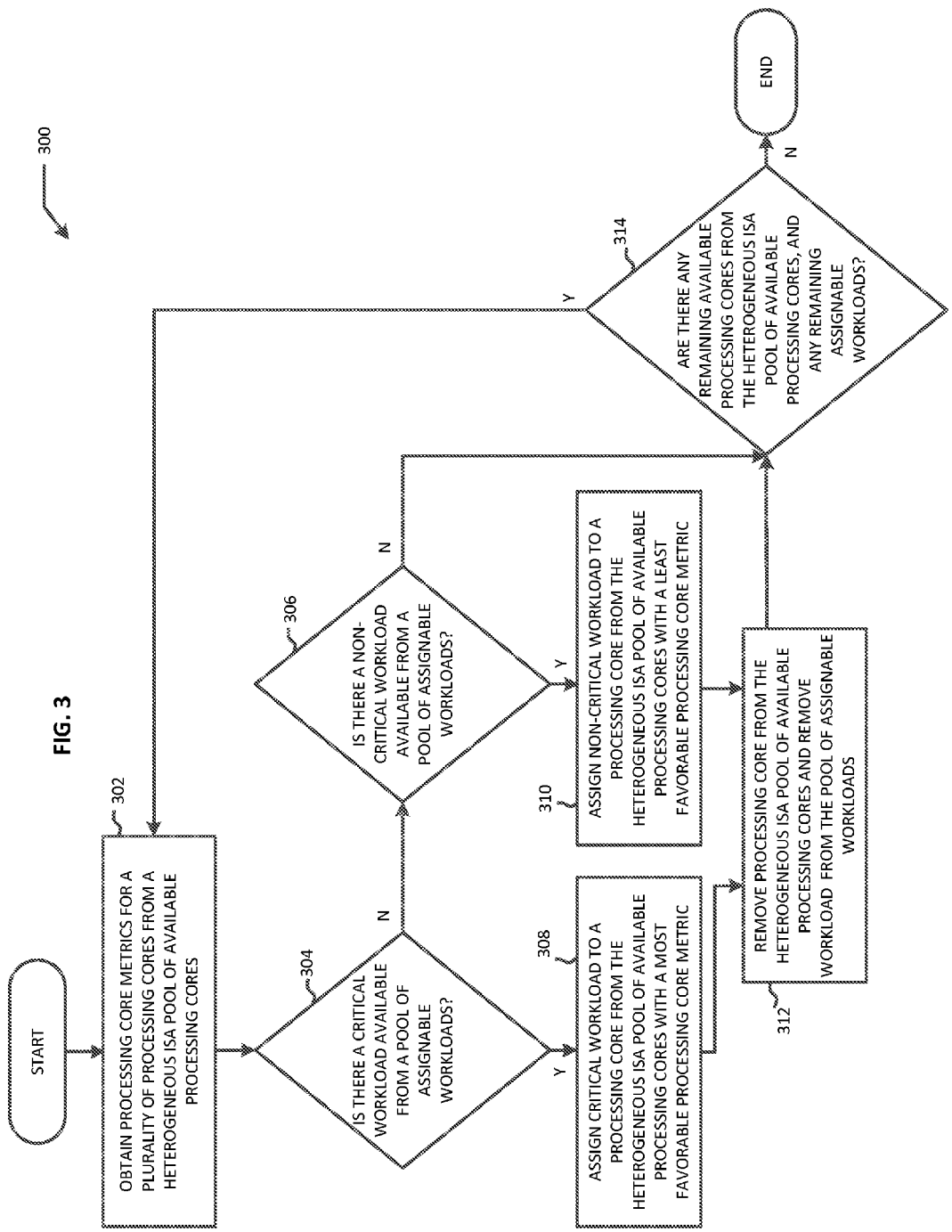
FIG. 3 is a flowchart of an example method for assigning processing core workloads to a processing core from a heterogeneous ISA pool of available processing cores based on obtained processing core metrics in accordance with one example set forth in the disclosure.

FIG. 3 is a flowchart of an example method for assigning processing core workloads to a processing core from a heterogeneous ISA pool of available processing cores based on obtained processing core metrics. The method illustrated in FIG. 3, and each of the example methods described herein, may be carried out by computing device 102, or by one or more of heterogeneous ISA based processing core workload placement logic 104, heterogeneous ISA based processing core workload profiler 202, or heterogeneous ISA based processing core workload scheduler 204. As such, the methods may be carried out by hardware or a combination of hardware and hardware executing software. Suitable hardware may include one or more GPUs, CPUs, APUs, ASICs, state machines, FPGAs, digital signal processors (DSPs), or other suitable hardware. Although the methods are described with reference to the illustrated flowcharts (e.g., in FIG. 3), it will be appreciated that many other ways of performing the acts associated with the methods may be used. For example, the order of some operations may be changed, and some of the operations described may be optional. Additionally, while the methods may be described with reference to the example computing device 102, it will be appreciated that the methods may be implemented by other apparatus as well, and that computing device 102 may implement other methods.

The example flowchart begins at block 302, where processing core metrics for a plurality of processing cores from a heterogeneous ISA pool of available processing cores (e.g., such as from processing cores associated with datacenter 160) are obtained. The method proceeds to decision block 304, where the method determines whether there is a critical processing core workload available from a pool of assignable processing core workloads. If it is determined that there is a critical processing core workload available, the method proceeds to block 308. For example, blocks 302 and 304 may be carried out by heterogeneous ISA based processing core workload profiler 202. At block 308, the critical processing core workload is assigned to a processing core from the heterogeneous ISA pool of available processing cores with a most favorable processing core metric, as may be carried out by, for example, heterogeneous ISA based processing core workload scheduler 204. The method then proceeds to block 312.

Going back to decision block 304, if it is determined that there is not a critical processing core workload available from the pool of assignable processing core workloads, the method proceeds to decision block 306. At decision block 306, the method determines if there is a non-critical workload available from the pool of assignable workloads. If it is determined that there is a non-critical workload available, the method proceeds to block 310, where the non-critical processing core workload is assigned to a processing core from the heterogeneous ISA pool of available processing cores with a least favorable processing core metric. The method then proceeds to block 312. For example, block 306 may be carried out by heterogeneous ISA based processing core workload profiler 202, while block 310 may be carried out by, for example, heterogeneous ISA based processing core workload scheduler 204. At block 312, the processing core assigned a processing core workload is removed from the heterogeneous ISA pool of available processing cores, and the processing core workload is removed from the pool of assignable processing core workloads. Block 312 may be carried out by, for example, heterogeneous ISA based processing core workload placement logic 104. The method then proceeds to decision block 314.

Going back to decision block 306, if it is determined that there is not a non-critical processing core workload available from the pool of assignable processing core workloads, the method proceeds to decision block 314. At decision block 314, a determination is made as to whether there are any remaining available processing cores form the heterogeneous ISA pool of available processing cores, and any remaining assignable processing core workloads from the pool of assignable processing core workloads. For example, block 314 may be carried out by heterogeneous ISA based processing core workload placement logic 104. If there are any remaining available processing cores, and any remaining assignable processing core workloads, the method proceeds back to block 302. Otherwise, the method ends.

Figure 4:
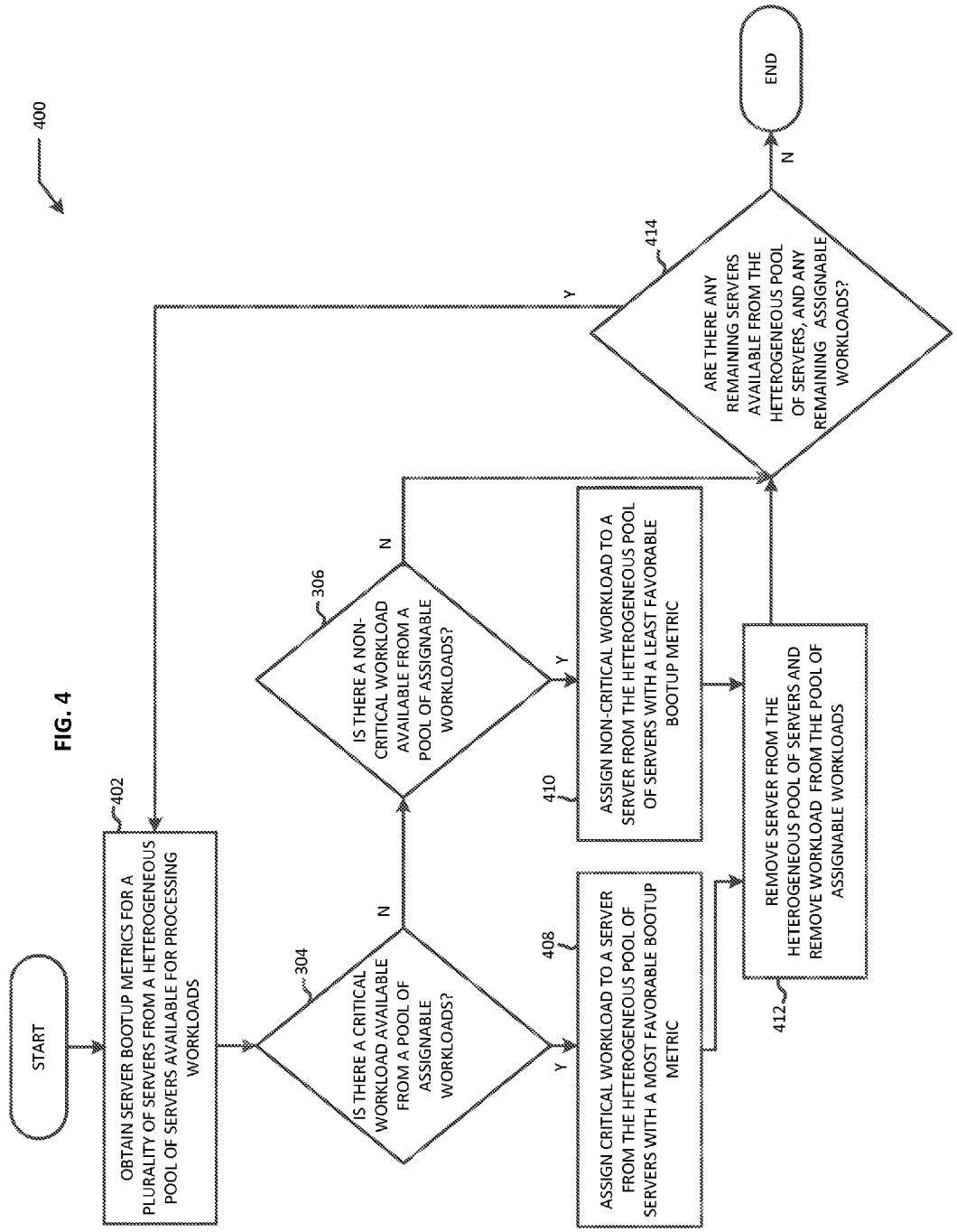
FIG. 4 is a flowchart of an example method for assigning processing core workloads to a processing core from a heterogeneous ISA pool of available processing cores based on obtained server bootup metric results in accordance with one example set forth in the disclosure.

FIG. 4 is a flowchart of an example method for assigning processing core workloads to a processing core from a heterogeneous ISA pool of available processing cores based on obtained server bootup metric results. The example flowchart begins at block 402, where server bootup metrics for a plurality of servers from a heterogeneous ISA pool of available processing cores (e.g., such as from first ISA based server 122, second ISA based server 132, and heterogeneous ISA based server 142) are obtained. Block 402 may be carried out by, for example, heterogeneous ISA based processing core workload profiler 202. The method proceeds to decision block 304, where the method determines whether there is a critical processing core workload available from a pool of assignable processing core workloads. If it is determined that there is a critical processing core workload available, the method proceeds to block 408. At block 408, the critical processing core workload is assigned to a server from the heterogeneous ISA pool of servers with a most favorable bootup metric as may be carried out by, for example, heterogeneous ISA based processing core workload scheduler 204. The method then proceeds to block 412.

Going back to decision block 304, if it is determined that there is not a critical processing core workload available from the pool of assignable processing core workloads, the method proceeds to decision block 306. At decision block 306, the method determines if there is a non-critical workload available from the pool of assignable workloads. If it is determined that there is a non-critical workload available, the method proceeds to block 410, where the non-critical processing core workload is assigned to a server from the heterogeneous ISA pool of servers with a least favorable bootup metric. Block 410 may be carried out by, for example, heterogeneous ISA based processing core workload scheduler 204. The method then proceeds to block 412. At block 412, the server assigned a processing core workload is removed from the heterogeneous ISA pool of servers, and the processing core workload is removed from the pool of assignable processing core workloads. For example, block 412 may be carried out by heterogeneous ISA based processing core workload placement logic 104. In one embodiment, the server assigned a processing core workload is removed from the heterogeneous ISA pool of servers only if the server is not able to execute additional processing core workloads. The method then proceeds to decision block 414.

Going back to decision block 306, if it is determined that there is not a non-critical processing core workload available from the pool of assignable processing core workloads, the method proceeds to decision block 414. At decision block 414, a determination is made as to whether there are any remaining available servers form the heterogeneous ISA pool of servers, and any remaining assignable processing core workloads from the pool of assignable processing core workloads. For example, block 414 may be carried out by heterogeneous ISA based processing core workload placement logic 104. If there are any remaining available servers, and any remaining assignable processing core workloads, the method proceeds back to block 402. Otherwise, the method ends.

Figure 5:
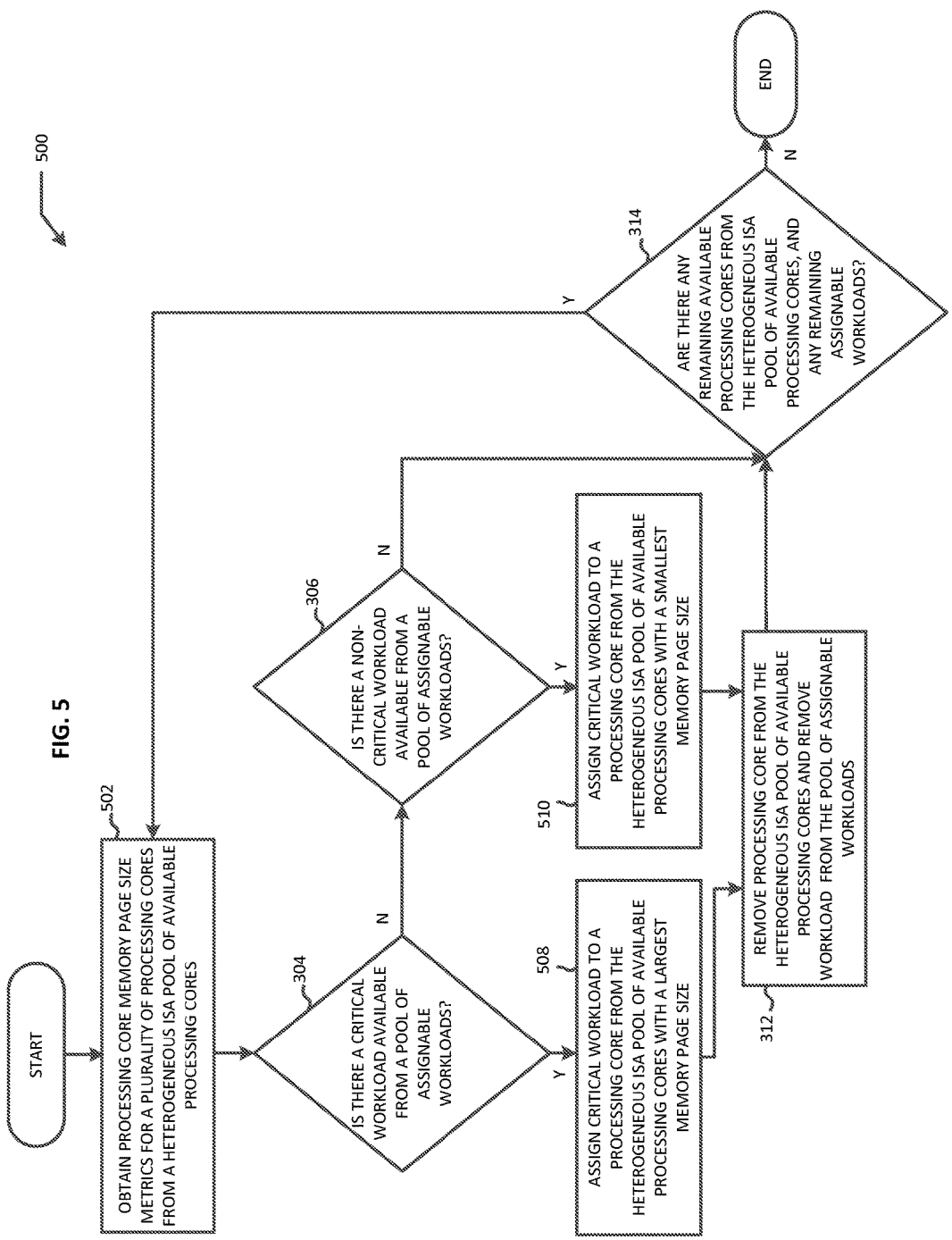
FIG. 5 is a flowchart of an example method for assigning processing core workloads to a processing core from a heterogeneous ISA pool of available processing cores based on obtained processing core memory page size metrics in accordance with one example set forth in the disclosure.

FIG. 5 is a flowchart of an example method for assigning processing core workloads to a processing core from a heterogeneous ISA pool of available processing cores based on obtained processing core memory page size metrics. The example flowchart begins at block 502, where processing core memory page size metrics for a plurality of processing cores from a heterogeneous ISA pool of available processing cores are obtained. Block 502 may be carried out by, for example, heterogeneous ISA based processing core workload profiler 202. The method proceeds to decision block 304, where the method determines whether there is a critical processing core workload available from a pool of assignable processing core workloads. If it is determined that there is a critical processing core workload available, the method proceeds to block 508. At block 508, the critical processing core workload is assigned to a processing core from the heterogeneous ISA pool of available processing cores with a largest memory page size (e.g., compared to the memory page sizes for one or more other available processing cores). Block 508 may be carried out by, for example, heterogeneous ISA based processing core workload scheduler 204. The method then proceeds to block 312.

Going back to decision block 304, if it is determined that there is not a critical processing core workload available from the pool of assignable processing core workloads, the method proceeds to decision block 306. At decision block 306, the method determines if there is a non-critical workload available from the pool of assignable workloads. If it is determined that there is a non-critical workload available, the method proceeds to block 510, where the non-critical processing core workload is assigned to a processing core from the heterogeneous ISA pool of available processing cores with a smallest memory page size (e.g., compared to the memory page sizes for one or more other available processing cores). Block 510 may be carried out by, for example, heterogeneous ISA based processing core workload scheduler 204. The method then proceeds to block 312. At block 312, the processing core assigned a processing core workload is removed from the heterogeneous ISA pool of available processing cores, and the processing core workload is removed from the pool of assignable processing core workloads. The method then proceeds to decision block 314.

Going back to decision block 306, if it is determined that there is not a non-critical processing core workload available from the pool of assignable processing core workloads, the method proceeds to decision block 314. At decision block 314, a determination is made as to whether there are any remaining available processing cores form the heterogeneous ISA pool of available processing cores, and any remaining assignable processing core workloads from the pool of assignable processing core workloads. If there are any remaining available processing cores, and any remaining assignable processing core workloads, the method proceeds back to block 302. Otherwise, the method ends.

Figure 6:
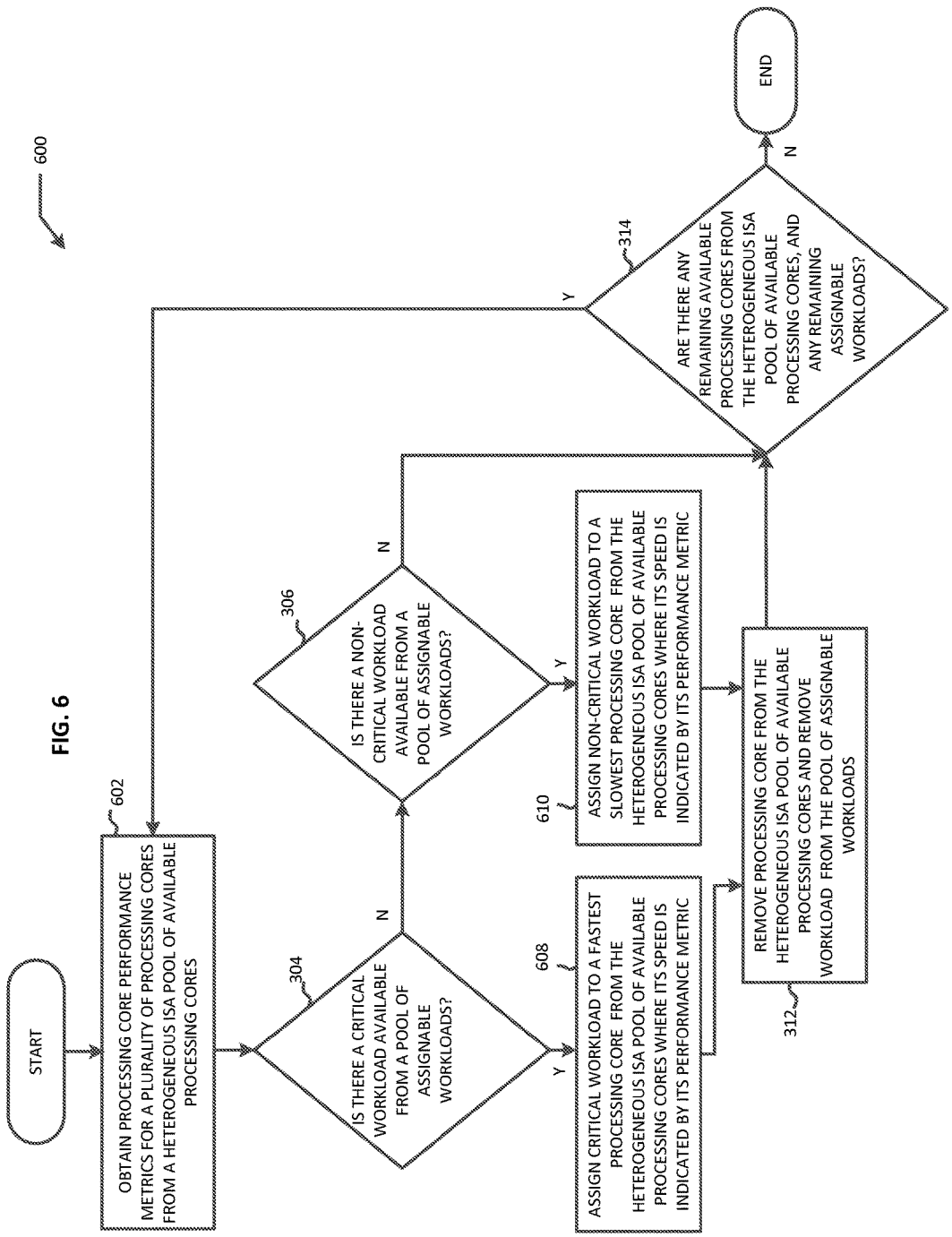
FIG. 6 is a flowchart of an example method for assigning processing core workloads to a processing core from a heterogeneous ISA pool of available processing cores based on obtained processing core performance metric results in accordance with one example set forth in the disclosure.

FIG. 6 is a flowchart of an example method for assigning processing core workloads to a processing core from a heterogeneous ISA pool of available processing cores based on obtained processing core performance metric results. The example flowchart begins at block 602, where processing core performance metrics for a plurality of processing cores from a heterogeneous ISA pool of available processing cores are obtained. Block 602 may be carried out by, for example, heterogeneous ISA based processing core workload profiler 202. The method proceeds to decision block 304, where the method determines whether there is a critical processing core workload available from a pool of assignable processing core workloads. If it is determined that there is a critical processing core workload available, the method proceeds to block 608. At block 608, the critical processing core workload is assigned to a fastest processing core from the heterogeneous ISA pool of available processing cores where the processing core's speed is indicated by its associated performance metric. Block 608 may be carried out by, for example, heterogeneous ISA based processing core workload scheduler 204. The method then proceeds to block 312.

Going back to decision block 304, if it is determined that there is not a critical processing core workload available from the pool of assignable processing core workloads, the method proceeds to decision block 306. At decision block 306, the method determines if there is a non-critical workload available from the pool of assignable workloads. If it is determined that there is a non-critical workload available, the method proceeds to block 610, where the non-critical processing core workload is assigned to a slowest processing core from the heterogeneous ISA pool of available processing cores where the processing core's speed is indicated by its associated performance metric. Block 610 may be carried out by, for example, heterogeneous ISA based processing core workload scheduler 204. The method then proceeds to block 312. At block 312, the processing core assigned a processing core workload is removed from the heterogeneous ISA pool of available processing cores, and the processing core workload is removed from the pool of assignable processing core workloads. The method then proceeds to decision block 314.

Going back to decision block 306, if it is determined that there is not a non-critical processing core workload available from the pool of assignable processing core workloads, the method proceeds to decision block 314. At decision block 314, a determination is made as to whether there are any remaining available processing cores form the heterogeneous ISA pool of available processing cores, and any remaining assignable processing core workloads from the pool of assignable processing core workloads. If there are any remaining available processing cores, and any remaining assignable processing core workloads, the method proceeds back to block 302. Otherwise, the method ends.

Figure 7:
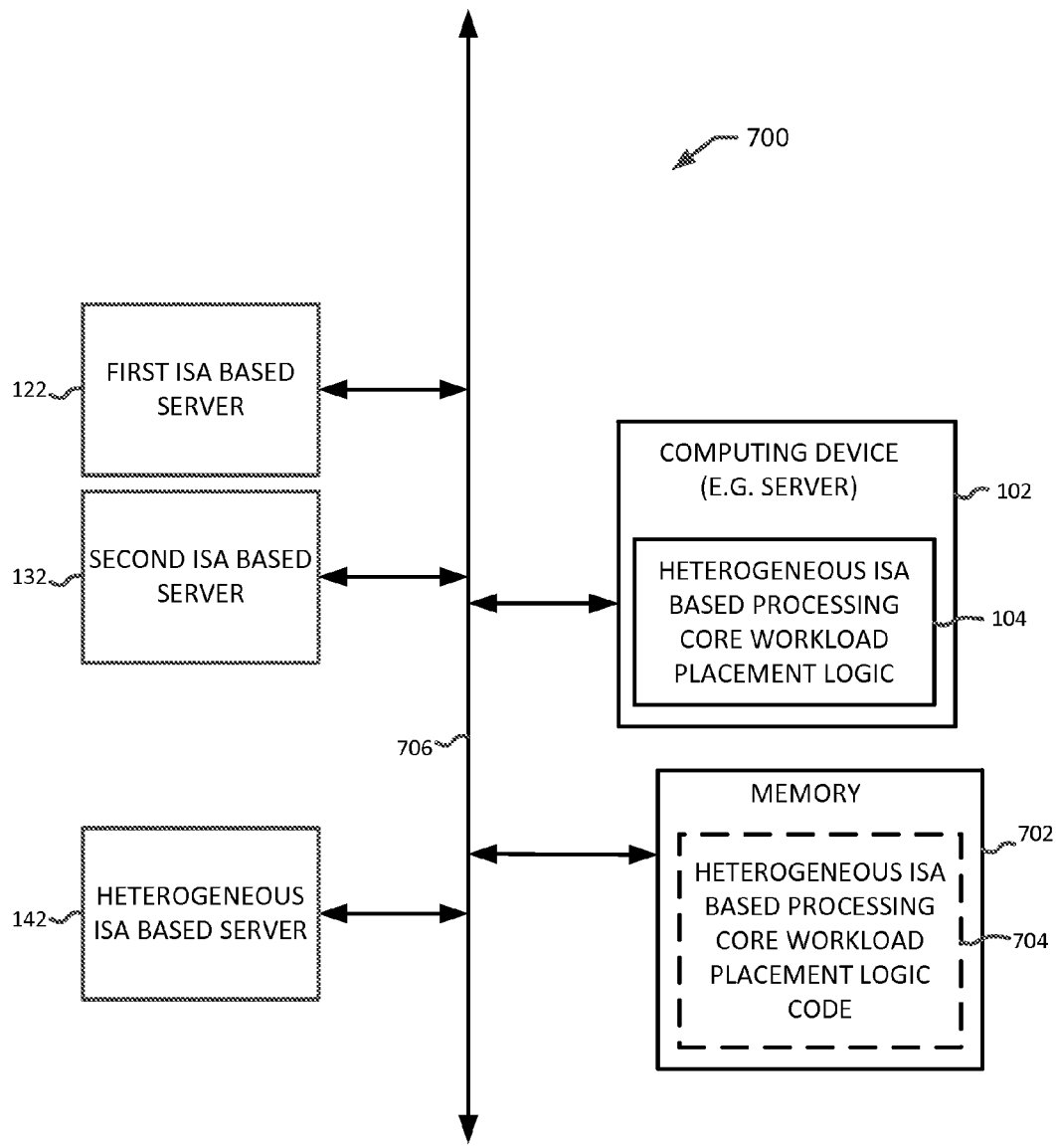
FIG. 7 is an example system that includes the computing device with heterogeneous ISA based processing core workload placement logic of FIG. 1, and heterogeneous ISA based processing core workload placement logic code residing in memory in accordance with one example set forth in the disclosure.

FIG. 7 is a functional block diagram illustrating an example apparatus 700 employing a computing device 102 that includes heterogeneous ISA based processing core workload placement logic 104 operatively coupled to expansion bus 706. Apparatus 700 also includes first ISA based server 122, second ISA based server 132, heterogeneous ISA based server 142, and memory 702 that may store heterogeneous ISA based processing core workload placement logic code 704, where each of these devices is operatively coupled to expansion bus 706.

In some examples, executable suitable instructions may be stored on a non-transitory computer readable storage medium, where the executable instructions are executable by one or more processors to cause the one or more processors to perform the actions described herein. Referring back to FIG. 7, memory 702 may store executable instructions, including heterogeneous ISA based processing core workload placement logic code 704, to be executed by computing device 102. Memory 702 may be any suitable memory, such as random access memory (RAM), non-volatile memory (e.g., read-only memory (ROM), flash memory, EPROM, EEPROM, etc.), a disk storage device, or any other suitable memory that may store executable instructions. Computing device 102 is operatively coupled to memory 702, for example via expansion bus 706, such that computing device 102 may obtain heterogeneous ISA based processing core workload placement logic code 704 from memory 702 for execution.

Some or all of this functionality may also be implemented in any other suitable manner such as, but not limited to, a software implementation including, for example, a driver implementation, a firmware implementation, a hardware implementation, or any suitable combination of the example implementations described above.

Among other advantages, the methods and apparatus provide for the assignment of processing core workloads from a pool of available processing core workloads to processing cores from a heterogeneous ISA pool of available processing cores based on obtained processing core metric results. As such, the methods and apparatus allow for the assignment of a processing core workload to a processing core based on a more suitable ISA for the particular processing core workload. In this manner, processing core workload requirements or preferences associated with the assigned processing core workloads are met or satisfied. In addition, datacenter processing workload execution efficiencies are improved. For example, processing core workloads are assigned to ISA based processing cores within cloud datacenter servers, such as cloud datacenters that make available a heterogeneous ISA pool of processing cores for executing processing core workloads, that are better suited (e.g., optimized) to execute a particular processing core workload. Persons of ordinary skill in the art would recognize and appreciate further advantages as well.

The foregoing description has been presented for the purposes of illustration and description. It is not intended to be exhaustive or to limit the invention to the exemplary embodiments disclosed. Many modifications and variations are possible in light of the above teachings. It is intended that the scope of the invention be limited not by this detailed description of examples, but rather by the claims appended hereto. The above detailed description of the embodiments and the examples described therein have been presented for the purposes of illustration and description only and not by limitation. It is therefore contemplated that the present invention cover any and all modifications, variations, or equivalents that fall within the scope of the basic underlying principles disclosed above and claimed herein.

What is claimed is:

1. A method, by a computing device, for processing core workload assignment comprising:
    obtaining, by the computing device, processing core metric results for a plurality of processing cores from a heterogeneous instruction set architecture (ISA) pool of available processing cores that are associated with a plurality of different servers in a data center, wherein the obtained processing core metric results include processing core metric results from a first set of processing cores based on a first ISA and from a second set of processing cores based on a second ISA, wherein the first ISA differs from the second ISA;
    determining, by the computing device, one or more processing core workloads from a pool of available processing core workloads that have higher priority than one or more other processing workloads from the pool of available processing core workloads to be assigned;
    obtaining, by the computing device, the one or more processing core workloads from the pool of available processing core workloads; and
    assigning, by the computing device, the one or more higher priority processing core workloads from the pool of available processing core workloads to a processing core from the heterogeneous ISA pool of available processing cores based on the first ISA with a processing core metric result that indicates a higher processing core performance than a processing core metric result for a processing core based on the second ISA.

2. The method of claim 1 wherein:
    obtaining processing core metric results includes obtaining processing core bootup times for the plurality of processing cores; and
    assigning the one or more higher priority processing core workloads includes assigning the one or more higher priority applications to a processing core from the heterogeneous ISA pool of available processing cores with a shortest bootup time.

3. The method of claim 2, further comprising:
    obtaining, by the computing device, a lower priority processing core workload from the pool of available processing core workloads to be assigned; and
    assigning, by the computing device, the lower priority processing core workload to a processing core from the heterogeneous ISA pool of available processing cores with a longer bootup time relative to the processing core with the shortest bootup time.

4. The method of claim 1, wherein obtaining the one or more higher priority processing workloads includes:
    obtaining, by the computing device, service level agreement data; and
    determining, by the computing device, the one or more higher priority processing core workloads from the pool of available processing core workloads to be assigned based on the obtained service level agreement data.

5. The method of claim 1 further comprising obtaining, by the computing device, one or more higher priority processing core workloads from the pool of available processing core workloads, wherein:
    obtaining processing core metric results includes obtaining, by the computing device, memory page sizes for the plurality of processing cores; and
    assigning the one or more higher priority processing core workloads includes assigning, by the computing device, the one or more higher priority processing core workloads to a processing core from the heterogeneous ISA pool of available processing cores with a largest memory page size.

6. The method of claim 5 further comprising:
    obtaining, by the computing device, one or more lower priority processing core workloads from the pool of available processing core workloads; and
    assigning, by the computing device, the one or more lower priority processing core workloads from the pool of available processing core workloads to a processing core from the heterogeneous ISA pool of available processing cores with a smaller memory page size relative to the processing core from the heterogeneous ISA pool of available processing cores with the largest memory page size.

7. The method of claim 1 wherein:
    obtaining processing core metric results includes obtaining, by the computing device, performance characteristics for the plurality of processing cores from the heterogeneous ISA pool of available processing cores; and assigning the one or more higher priority processing core workloads includes assigning, by the computing device, the one or more higher priority processing core workloads to a fastest executing processing core from the heterogeneous ISA pool of available processing cores based on the obtained performance characteristics for the plurality of processing cores.

8. The method of claim 7 further comprising:
obtaining, by the computing device, one or more lower priority processing core workloads from the pool of available processing core workloads; and
assigning, by the computing device, the one or more lower priority processing core workloads to a slower processing core from the heterogeneous ISA pool of available processing cores based on the slower processing core's performance characteristic relative to the fastest executing processing core's performance characteristic.

9. The method of claim 1 wherein:
obtaining processing core metric results includes:
 obtaining, by the computing device, processing core metric results from one or more first ISA based processing cores associated with a first ISA based server from the heterogeneous ISA pool of available processing cores;
 obtaining, by the computing device, processing core metric results from one or more second ISA based processing cores associated with a second ISA based server from the heterogeneous ISA pool of available processing cores; and
 obtaining, by the computing device, processing core metric results from a plurality of heterogeneous ISA based processing cores associated with a heterogeneous ISA based server from the heterogeneous ISA pool of available processing cores;
obtaining the one or more higher priority processing core workloads includes obtaining, by the computing device, one or more higher priority applications awaiting to be scheduled for execution; and
assigning the one or more higher priority processing core workloads includes assigning, by the computing device, the one or more higher priority applications to at least one of:
 the one or more first ISA based processing cores associated with the first ISA based server from the heterogeneous ISA pool of available processing cores;
 the one or more second ISA based processing cores associated with the second ISA based server from the heterogeneous ISA pool of available processing cores; and
 at least one of the plurality of heterogeneous ISA based processing cores associated with the heterogeneous ISA based server from the heterogeneous ISA pool of available processing cores.

10. A computing device comprising:
a processing core workload profiler operable to:
 obtain processing core metric results for a plurality of processing cores from a heterogeneous instruction set architecture (ISA) pool of available processing cores that are associated with a plurality of different servers in a data center, wherein the obtained processing core metric results include processing core metric results from a first set of processing cores based on a first ISA and from a second set of processing cores based on a second ISA, wherein the first ISA differs from the second ISA; and
 determine one or more processing core workloads from a pool of available processing core workloads that have higher priority than one or more other processing workloads from the pool of available processing core workloads to be assigned;
 obtain the one or more processing core workloads from the pool of available processing core workloads; and
a processing core workload scheduler operable to assign the one or more higher priority processing core workloads to a processing core based on the first ISA with a processing core metric result that indicates a higher processing core performance than a processing core metric result for a processing core based on the second ISA.

11. The computing device of claim 10 wherein:
the processing core workload profiler is operable to obtain processing core bootup times for the plurality of processing cores from the heterogeneous ISA pool of available processing cores; and
the processing core workload scheduler is operable to assign the one or more higher priority applications to a processing core from the heterogeneous ISA pool of available processing cores with a shortest bootup time.

12. The computing device of claim 11 wherein:
the processing core workload profiler is operable to obtain a lower priority processing core workload from the pool of available processing core workloads to be assigned; and
the processing core workload scheduler is operable to assign the lower priority processing core to a processing core from the heterogeneous ISA pool of available processing cores with a longer bootup time relative to the processing core with the shortest bootup time.

13. The computing device of claim 10 wherein the processing core workload profiler is operable to:
obtain service level agreement data; and
determine the one or more higher priority processing core workloads from the pool of available processing core workloads to be assigned based on the obtained service level agreement data.

14. The computing device of claim 10 wherein:
the processing core workload profiler is operable to:
 obtain memory page sizes for the plurality of processing cores from the heterogeneous ISA pool of available processing cores; and
 obtain one or more higher priority processing core workloads from the pool of available processing core workloads; and
the processing core workload scheduler is operable to assign the one or more higher priority processing core workloads from the pool of available processing core workloads to a processing core from the heterogeneous ISA pool of available processing cores with a largest memory page size.

15. The computing device of claim 14 wherein:
the processing core workload profiler is operable to obtain one or more lower priority processing core workloads from the pool of available processing core workloads; and
the processing core workload scheduler is operable to assign the one or more lower priority processing core workloads from the pool of available processing core workloads to a processing core from the heterogeneous ISA pool of available processing cores with a smaller memory page size relative to the processing core from the heterogeneous ISA pool of available processing cores with the largest memory page size.

16. The computing device of claim 10 wherein:
the processing core workload profiler is operable to obtain performance characteristics for the plurality of processing cores from the heterogeneous ISA pool of available processing cores; and
the processing core workload scheduler is operable to assign the one or more higher priority processing core to a fastest executing processing core from the heterogeneous ISA pool of available processing cores based on the obtained performance characteristics for the plurality of processing cores.

17. The computing device of claim 16 wherein:
the processing core workload profiler is operable to obtain one or more lower priority processing core workloads from the pool of available processing core workloads; and
the processing core workload scheduler is operable to assign the one or more lower priority processing core workloads to a slower processing core from the heterogeneous ISA pool of available processing cores based on the slower processing core's performance characteristic relative to the fastest executing processing core's performance characteristic.

18. The computing device of claim 10 wherein:
the processing core workload profiler is operable to:
 obtain processing core metric results from:
  one or more first ISA based processing cores associated with a first ISA based server from the heterogeneous ISA pool of available processing cores;
  one or more second ISA based processing cores associated with a second ISA based server from the heterogeneous ISA pool of available processing cores; and
  a plurality of heterogeneous ISA based processing cores associated with a heterogeneous ISA based server from the heterogeneous ISA pool of available processing cores; and
 obtain one or more higher priority applications awaiting to be scheduled for execution; and
the processing core workload scheduler is operable to:
 assign the one or more higher priority applications awaiting to be scheduled for execution to at least one of:
  the one or more first ISA based processing cores associated with the first ISA based server from the heterogeneous ISA pool of available processing cores;
  the one or more second ISA based processing cores associated with the second ISA based server from the heterogeneous ISA pool of available processing cores; and
  at least one of the plurality of heterogeneous ISA based processing cores from the heterogeneous ISA pool of available processing cores associated with the heterogeneous ISA based server.

19. A non-transitory computer readable medium comprising executable instructions that when executed by one or more processors cause the one or more processors to:
 obtain processing core metric results for a plurality of processing cores from a heterogeneous instruction set architecture (ISA) pool of available processing cores that are associated with plurality of different servers in a data center, wherein the obtained processing core metric results include processing core metric results from a first set of processing cores based on a first ISA and from a second set of processing cores based on a second ISA, wherein the first ISA differs from the second ISA;
 determine one or more processing core workloads from a pool of available processing core workloads that have higher priority than one or more other processing workloads from the pool of available processing core workloads to be assigned;
 obtain the one or more processing core workloads from the pool of available processing core workloads; and
 assign the one or more higher priority processing core workloads to a processing core from the heterogeneous ISA pool of available processing cores based on the first ISA with a processing core metric result that indicates a higher processing core performance than a processing core metric result for a processing core based on the second ISA.

20. The non-transitory computer readable medium of claim 19 wherein the executable instructions cause the one or more processors to:
 obtain processing core metric results from:
  one or more first ISA based processing cores associated with a first ISA based server from the heterogeneous ISA pool of available processing cores;
  one or more second ISA based processing cores associated with a second ISA based server from the heterogeneous ISA pool of available processing cores; and
  a plurality of heterogeneous ISA based processing cores associated with a heterogeneous ISA based server from the heterogeneous ISA pool of available processing cores;
 obtain one or more higher priority applications awaiting to be scheduled for execution; and
 assign the one or more higher priority applications to at least one of:
  the one or more first ISA based processing cores associated with the first ISA based server from the heterogeneous ISA pool of available processing cores;
  the one or more second ISA based processing cores associated with the second ISA based server from the heterogeneous ISA pool of available processing cores; and
  at least one of the plurality of heterogeneous ISA based processing cores associated with the heterogeneous ISA based server from the heterogeneous ISA pool of available processing cores.

* * * * *